(12) United States Patent
Register et al.

(10) Patent No.: US 12,403,633 B2
(45) Date of Patent: Sep. 2, 2025

(54) SYSTEM FOR HEATING CONTOURED SURFACE OF STRUCTURAL MEMBER

(71) Applicant: The Boeing Company, Chicago, IL (US)

(72) Inventors: Justin H. Register, Charleston, SC (US); Alice R. Arnold, Charleston, SC (US)

(73) Assignee: The Boeing Company, Arlington, VA (US)

( * ) Notice: Subject to any disclaimer, the term of this patent is extended or adjusted under 35 U.S.C. 154(b) by 930 days.

(21) Appl. No.: 17/505,586

(22) Filed: Oct. 19, 2021

(65) Prior Publication Data

US 2022/0250286 A1    Aug. 11, 2022

Related U.S. Application Data

(60) Provisional application No. 63/148,593, filed on Feb. 11, 2021.

(51) Int. Cl.
| | |
|---|---|
| B29C 35/02 | (2006.01) |
| B29C 43/10 | (2006.01) |
| B29C 43/36 | (2006.01) |
| B29K 101/10 | (2006.01) |

(52) U.S. Cl.
CPC ...... *B29C 35/02* (2013.01); *B29C 2035/0211* (2013.01); *B29K 2101/10* (2013.01)

(58) Field of Classification Search
CPC ......... B29C 43/3642; B29C 2035/0211; B29C 2043/3649; B29C 43/10; B29C 35/02; B29K 2101/10
USPC .......................................... 219/213
See application file for complete search history.

(56) References Cited

U.S. PATENT DOCUMENTS

| | | | |
|---|---|---|---|
| 6,231,796 B1 * | 5/2001 | Allen ................... | B29C 43/3642 264/72 |
| 6,398,992 B1 * | 6/2002 | Jacobson ............. | B29C 33/3821 264/108 |
| 11,001,014 B2 * | 5/2021 | Register ............... | B29C 70/544 |
| 2019/0030842 A1 * | 1/2019 | Miranda ............... | B29C 70/44 |
| 2019/0176410 A1 * | 6/2019 | Register ............... | B64F 5/10 |

\* cited by examiner

*Primary Examiner* — Eric S Stapleton
(74) *Attorney, Agent, or Firm* — Kolitch Romano Dascenzo Gates LLC

(57) ABSTRACT

A heater for heating a contoured surface of a structural member includes a bladder, a granular material within the bladder, where the granular material is capable of exhibiting granular jamming when air is removed from the bladder, and a heating element positioned within the bladder and in contact with the granular material.

20 Claims, 12 Drawing Sheets

SYSTEM FOR HEATING CONTOURED SURFACE OF STRUCTURAL MEMBER

CROSS REFERENCE TO RELATED APPLICATION

The present application is a non-provisional patent application claiming priority to U.S. Provisional Application No. 63/148,593, filed on Feb. 11, 2021, the contents of which are hereby incorporated by reference.

FIELD

The present disclosure generally relates to heaters, and more specifically to heaters configured for heating a contoured surface of a structural member.

BACKGROUND

Composite parts, such as those used in the manufacture of aircraft, can be constructed using various production methods, such as filament winding, tape placement, hand lay-up, or other composite processing techniques and curing processes. Most of these processes use a rigid cure tool/mandrel on which composite material is applied and then cured into a rigid composite part. For example, automated fiber placement (AFP) machines may be used to place fiber reinforcements on molds or mandrels to form composite layups. Following, composite parts may be cured within an autoclave that applies heat and pressure to the part during a cure cycle.

However, sometimes it is necessary to apply heat locally to a specific area of the part during formation or repair. Existing solutions for doing this, such as heating blankets, often suffer from poor contact to contoured surfaces that can result in uneven heating of the part. Some existing heaters also have inherent non-idealities that lead to localized variances in temperature. As such, there is a need for a heater that provides better contact and/or more uniform heating to a contoured surface of a composite part.

SUMMARY

One aspect of the disclosure is a heater for heating a contoured surface of a structural member, the heater comprising: a bladder; a granular material within the bladder, wherein the granular material is capable of exhibiting granular jamming when air is removed from the bladder; and a heating element positioned within the bladder and in contact with the granular material.

Another aspect of the disclosure is a system for heating a contoured surface of a structural member, the system comprising: a bladder; a granular material within the bladder, wherein the granular material is capable of exhibiting granular jamming when air is removed from the bladder; a heating element positioned within the bladder and in contact with the granular material; and a pump that, when the bladder is against the contoured surface of the structural member, is configured to remove air from the bladder to compress the granular material such that the granular material exhibits granular jamming that causes the bladder to provide rigid support against the contoured surface of the structural member.

Another aspect of the disclosure is a method for heating a contoured surface of a structural member, the method comprising: placing a bladder against the contoured surface of the structural member such that the bladder conforms to the contoured surface; removing air from the bladder to compress a granular material within the bladder such that the granular material exhibits granular jamming that causes the bladder to provide rigid support against the contoured surface; and heating the contoured surface via a heating element that is within the bladder and in contact with the granular material.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

As discussed above, a need exists for a heater that provides better contact and/or more uniform heating to a contoured surface of a composite part during processing. Within examples, a heater for heating a contoured surface of a structural member (e.g., a composite stringer) includes a bladder and a granular material (e.g., ceramic beads) within the bladder. The granular material is capable of exhibiting granular jamming when air is removed from the bladder. The heater also includes a heating element (e.g., a carbon sheet or scrim) positioned within the bladder and in contact with the granular material.

In another example, a method for heating a contoured surface of a structural member includes placing the bladder against the contoured surface of the structural member such that the bladder conforms to the contoured surface and removing air from the bladder to compress the granular material within the bladder such that the granular material exhibits granular jamming that causes the bladder to provide rigid support against the contoured surface. The method also includes heating the contoured surface via the heating element that is within the bladder and in contact with the granular material.

The aforementioned heater and method can provide more uniform and predictable heating to a composite part during processing when compared to conventional heaters or methods.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

FIGS. 1-10 are schematic diagrams of a heater 100, a system 200, and related functionality.

Figure 1:
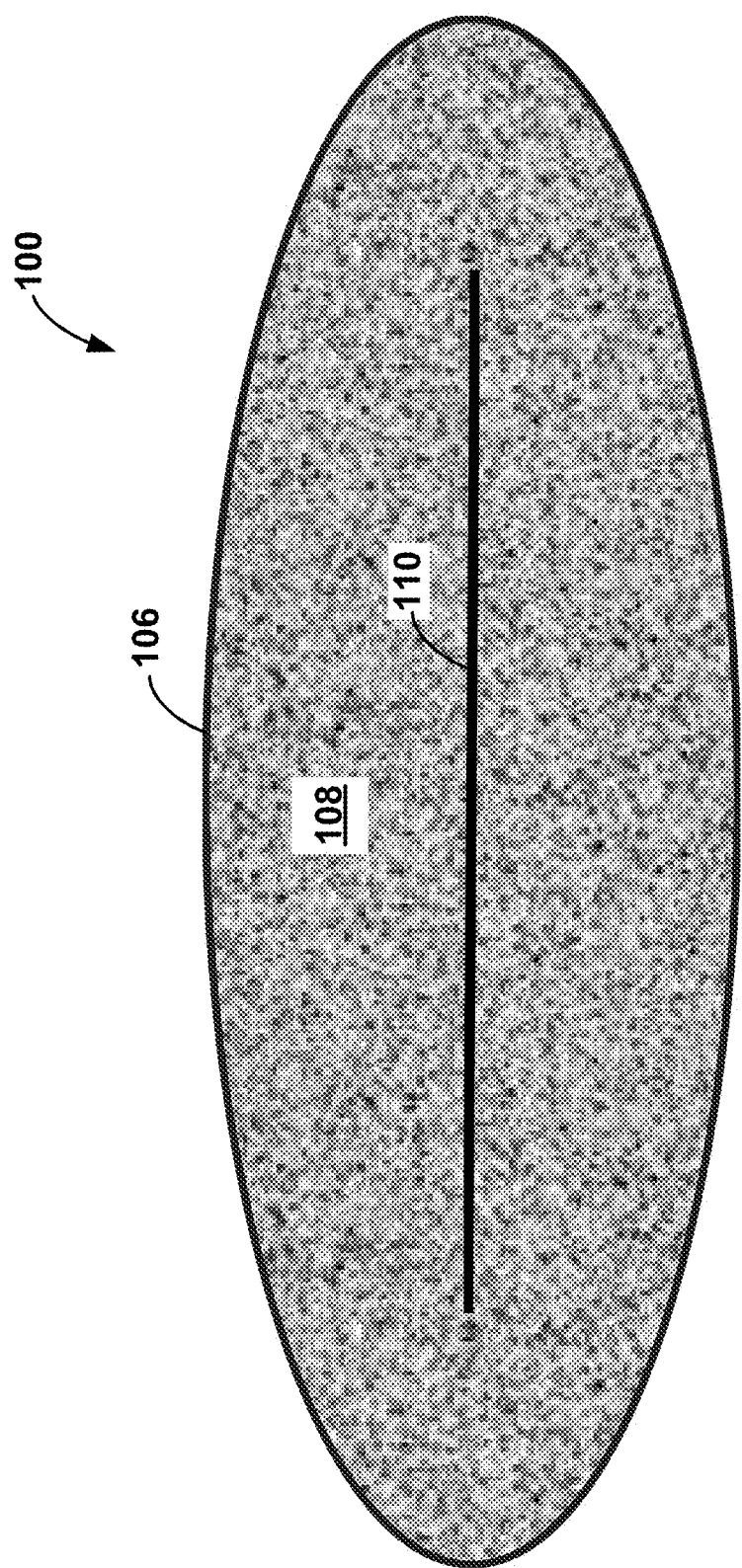
FIG. 1 is a schematic cross section of a heater, according to an example.

FIG. 1 is a schematic cross section of the heater 100 for heating a contoured surface of a structural member. The heater 100 includes a first bladder 106 and a granular material 108 within the first bladder 106. The granular material 108 is capable of exhibiting granular jamming when air is removed from the first bladder 106. The heater 100 also includes a heating element 110 positioned within the first bladder 106 and in contact with the granular material 108. The structural member and its contoured surface are discussed in more detail below.

The first bladder 106 takes the form of a balloon, a sack, or any other sort of flexible container that can withstand temperatures generated by the heater 100. The first bladder 106 includes or is formed of an elastic material that is impermeable to air, such as one or more of rubber, latex, polychloroprene, or nylon fabric.

The granular material 108 is electrically non-conductive and includes one or more of sand, ball bearings, glass beads, ceramic beads, quartz beads, a foam, a polymer, an emulsion, or a suspension. The granular material 108 being electrically non-conductive prevents short circuits from occurring. The granular material 108 exhibiting granular jamming typically means that the granular material 108 collectively "hardens" into a shape that conforms somewhat to a contoured surface against which the granular material 108 is placed.

The heating element 110 includes a resistive heating element, such as a sheet of carbon or a conductive wire. The heating element 110 is configured to generate heat via ohmic losses generated when electric current is passed through the heating element 110.

Figure 2:
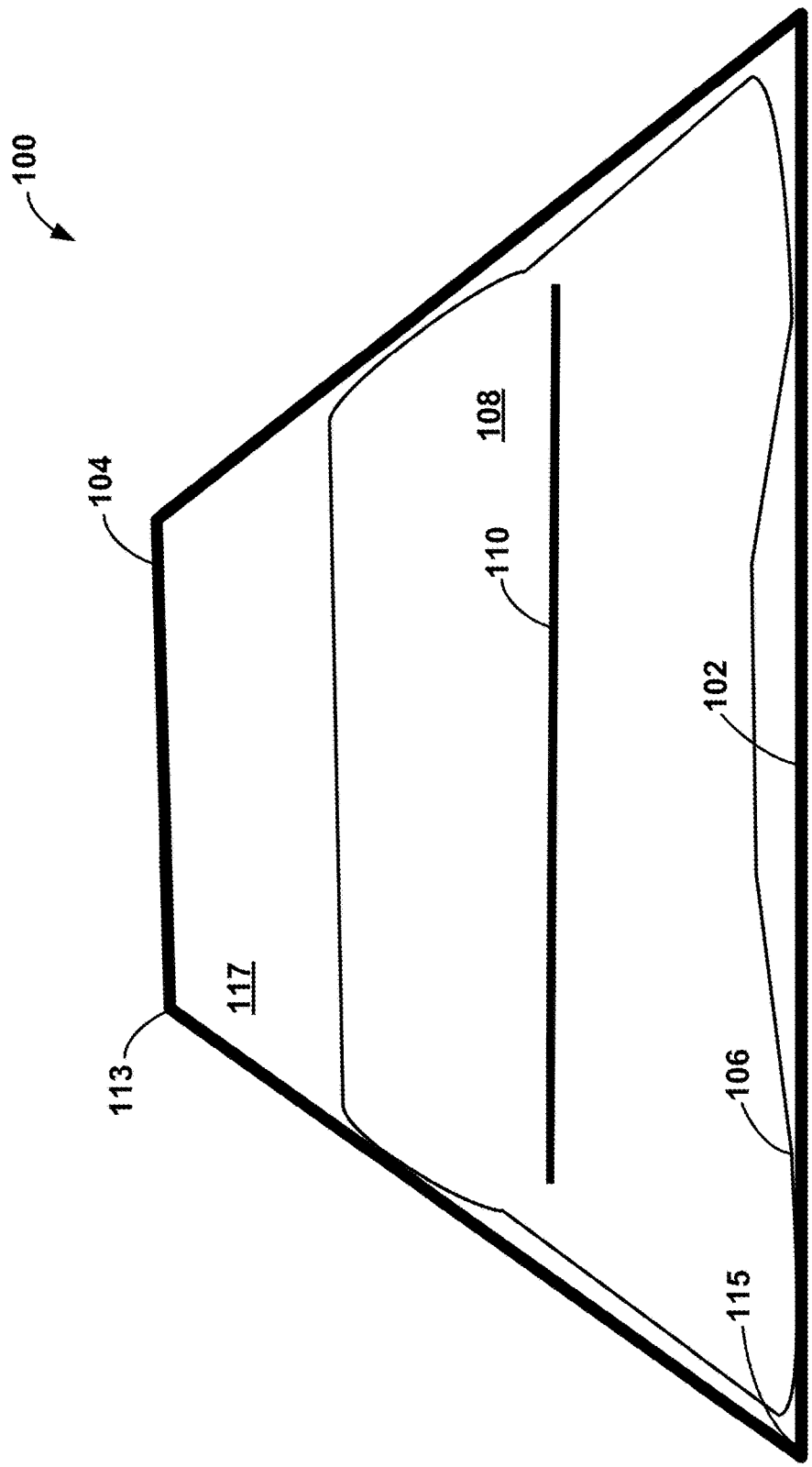
FIG. 2 is a schematic cross section of a heater and a structural member, according to an example.

FIG. 2 is a schematic cross section of the heater 100 and a structural member 104. The structural member 104 can be an aircraft stringer having a contoured surface 102 that defines a cavity 117, for example. The contoured surface 102 has a trapezoidal shape defining a closed curve with four corners, but other examples are possible. For example, the contoured surface could have openings or gaps such that a closed curve is not formed by the contoured surface, could have other shapes such as circular, square, rectangular, z-shaped, or irregular, and/or could have one or more portions that are concave or convex. In this example, internal corners 115 of the contoured surface 102 form concave surfaces. In another example, the heater 100 could be placed against and used to heat a convex surface such as exterior corners 113 of the structural member 104.

As shown, the first bladder 106 in a somewhat deflated form is placed within the cavity 117 against the contoured surface 102 of the structural member 104. In other examples, the first bladder 106 is not placed within a cavity but against another (e.g., external) surface of the structural member 104.

Figure 3:
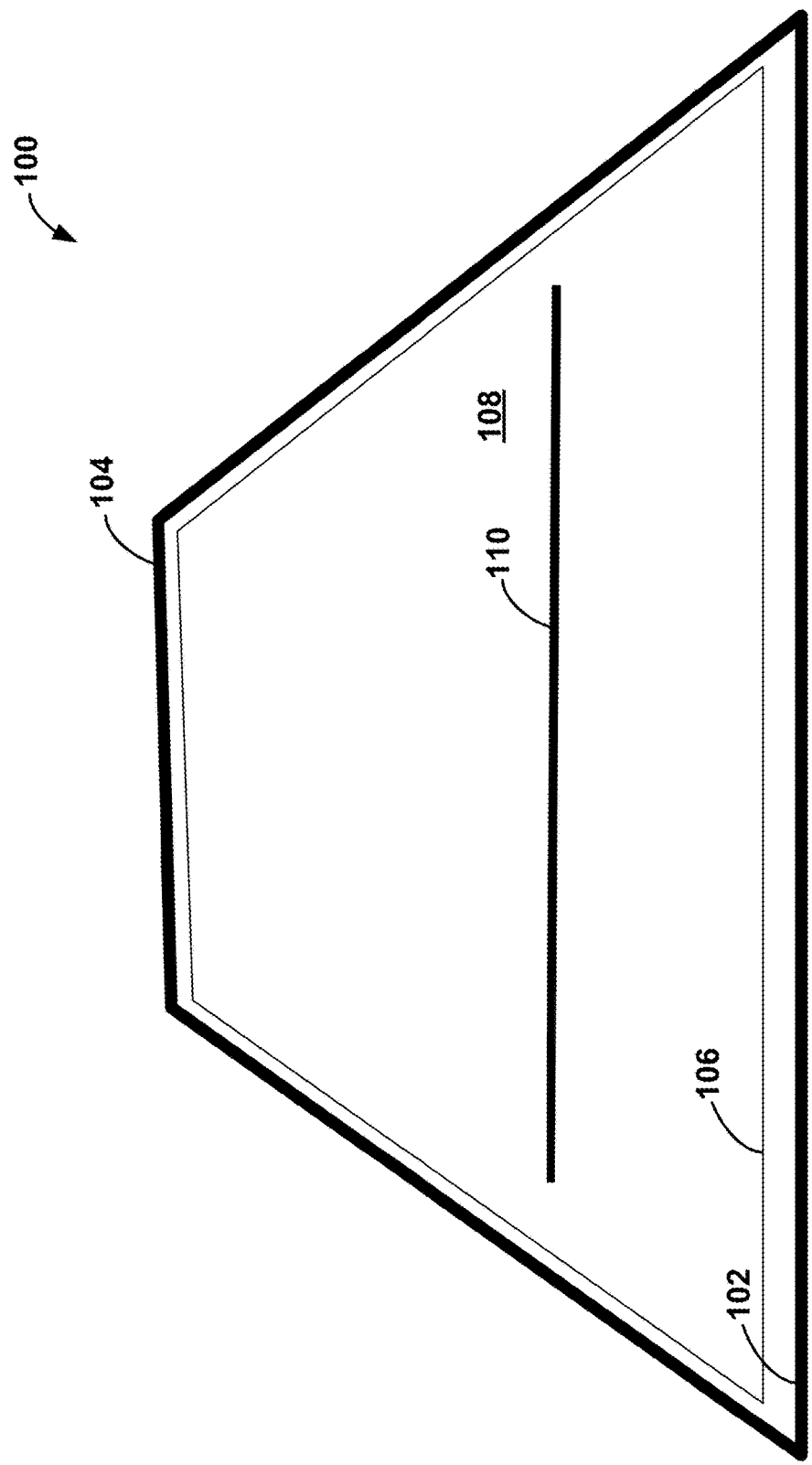
FIG. 3 is a schematic cross section of a heater and a structural member, according to an example.

FIG. 3 is another schematic cross section of the heater 100 and the structural member 104. The first bladder 106 is inflated (e.g., via a pump) against the contoured surface 102 such that the first bladder 106 conforms to the contoured surface 102. In FIG. 3, the size of some air gaps between the first bladder 106 and the contoured surface 102 are exaggerated for illustrative purposes.

Additionally, a pump can be used to remove at least some air from the first bladder 106 to compress the granular material 108 within the first bladder 106 such that the granular material 108 exhibits granular jamming that causes the first bladder 106 to provide rigid support against the contoured surface 102.

Next, the heating element 110 can be used to heat the contoured surface 102. Generally, the heating of the contoured surface 102 is performed via thermal conduction of heat generated by the heating element 110 through the granular material 108.

After heating the contoured surface 102, the first bladder 106 can be deflated and removed from the contoured surface 102 and/or the cavity 117.

Figure 4:
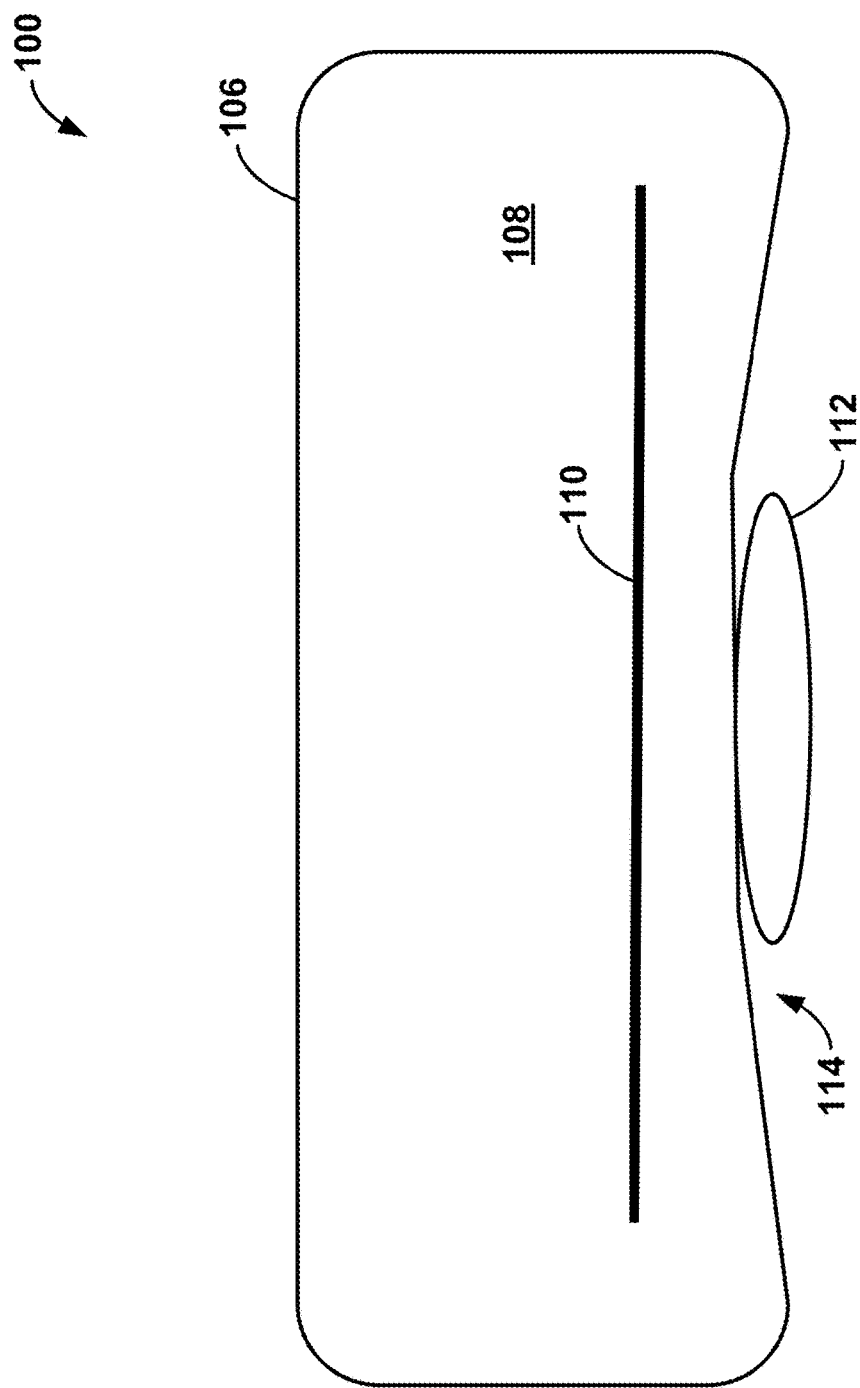
FIG. 4 is a schematic cross section of a heater, according to an example.

FIG. 4 is another schematic cross section of the heater 100. In this example, the heater 100 also includes a second bladder 112 configured to expand and apply a force to the first bladder 106. The second bladder 112 is positioned adjacent to an exterior surface 114 of the first bladder 106.

Figure 5:
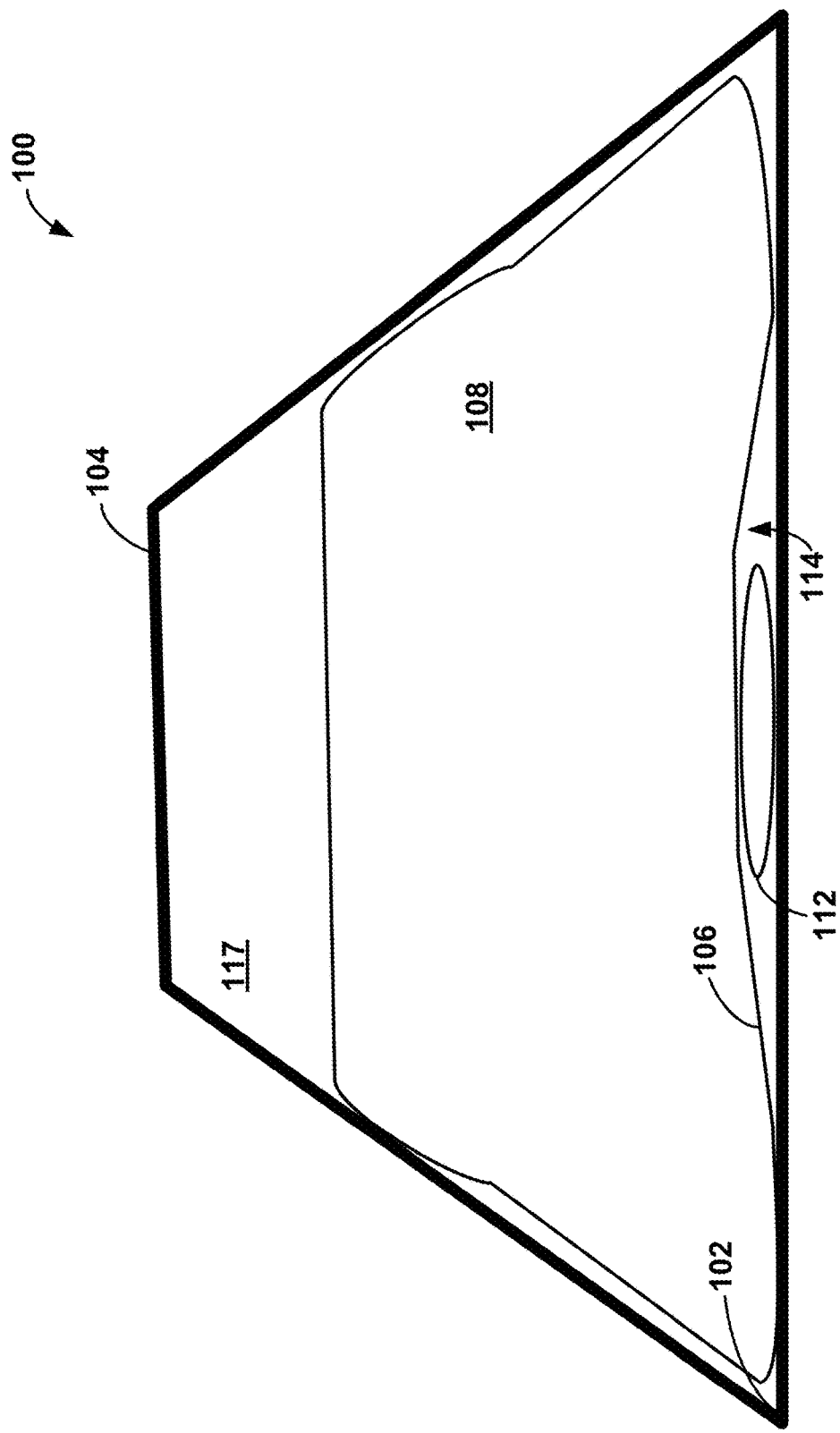
FIG. 5 is a schematic cross section of a heater and a structural member, according to an example.

FIG. 5 is another schematic cross section of the heater 100 shown in FIG. 4 and the structural member 104. As shown, the first bladder 106 and the second bladder 112 in a somewhat deflated form are placed within the cavity 117 against the contoured surface 102 of the structural member 104. In other examples, the first bladder 106 and the second bladder 112 are not placed within a cavity but against another (e.g., external) surface of the structural member 104.

Figure 6:
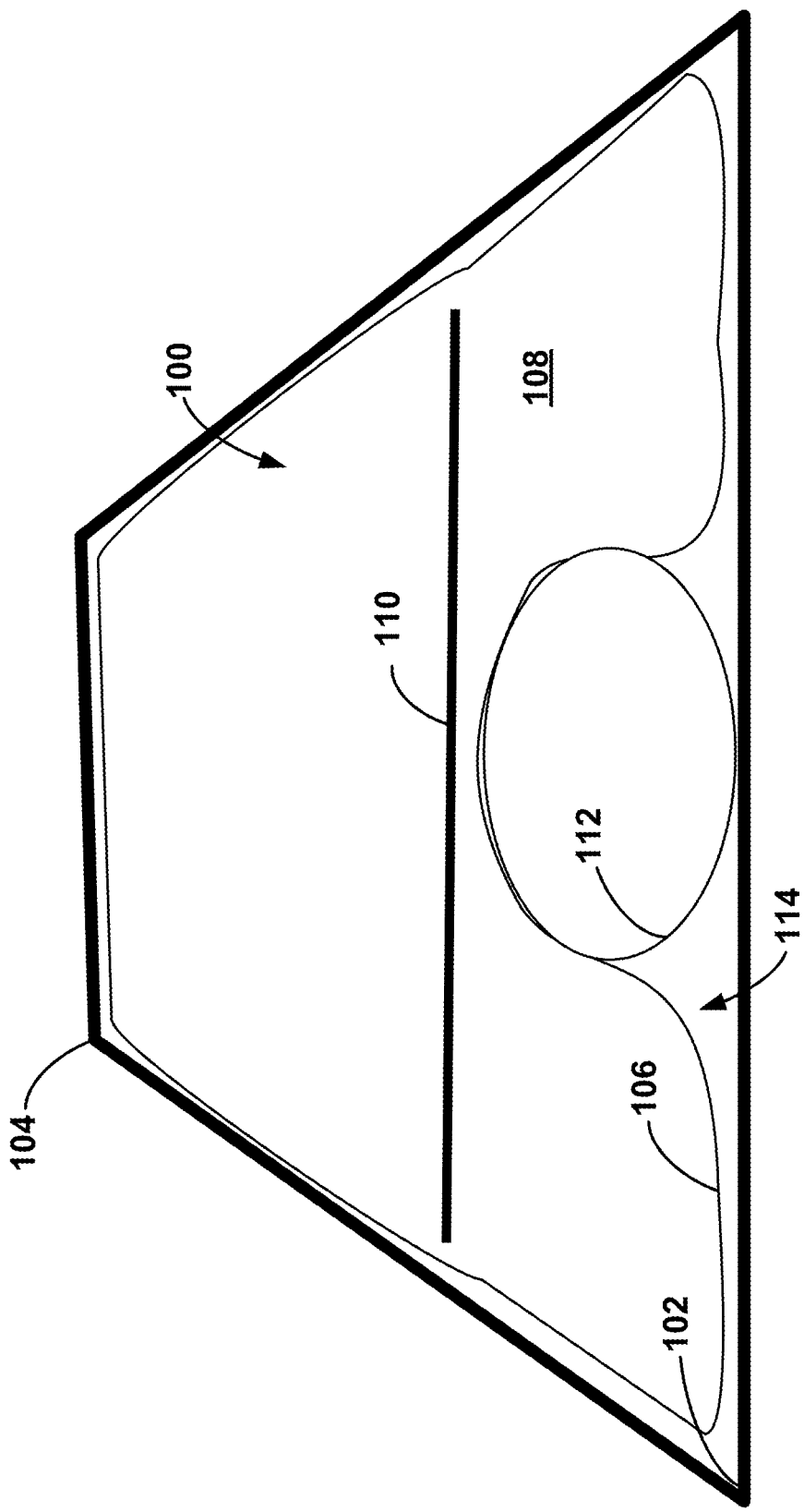
FIG. 6 is a schematic cross section of a heater and a structural member, according to an example.

FIG. 6 is another schematic cross section of the heater 100 shown in FIG. 4 and the structural member 104. The first bladder 106 is inflated (e.g., via a pump) against the contoured surface 102 such that the first bladder 106 conforms to the contoured surface 102. In FIG. 6, the size of some air gaps between the first bladder 106 and the contoured surface 102 are exaggerated for illustrative purposes.

Additionally, the second bladder 112 can be inflated such that the second bladder 112 expands and forces the first bladder 106 against the contoured surface 102 for better conformance of the first bladder 106 to the contoured surface 102.

Additionally, a pump can be used to remove at least some air from the first bladder 106 to compress the granular material 108 within the first bladder 106 such that the granular material 108 exhibits granular jamming that causes the first bladder 106 to provide rigid support against the contoured surface 102.

Next, the heating element 110 can be used to heat the contoured surface 102. Generally, the heating of the contoured surface 102 is performed via thermal conduction of heat generated by the heating element 110 through the granular material 108.

After heating the contoured surface 102, the first bladder 106 and/or the second bladder 112 can be deflated and removed from the contoured surface 102 and/or the cavity 117.

Figure 7:
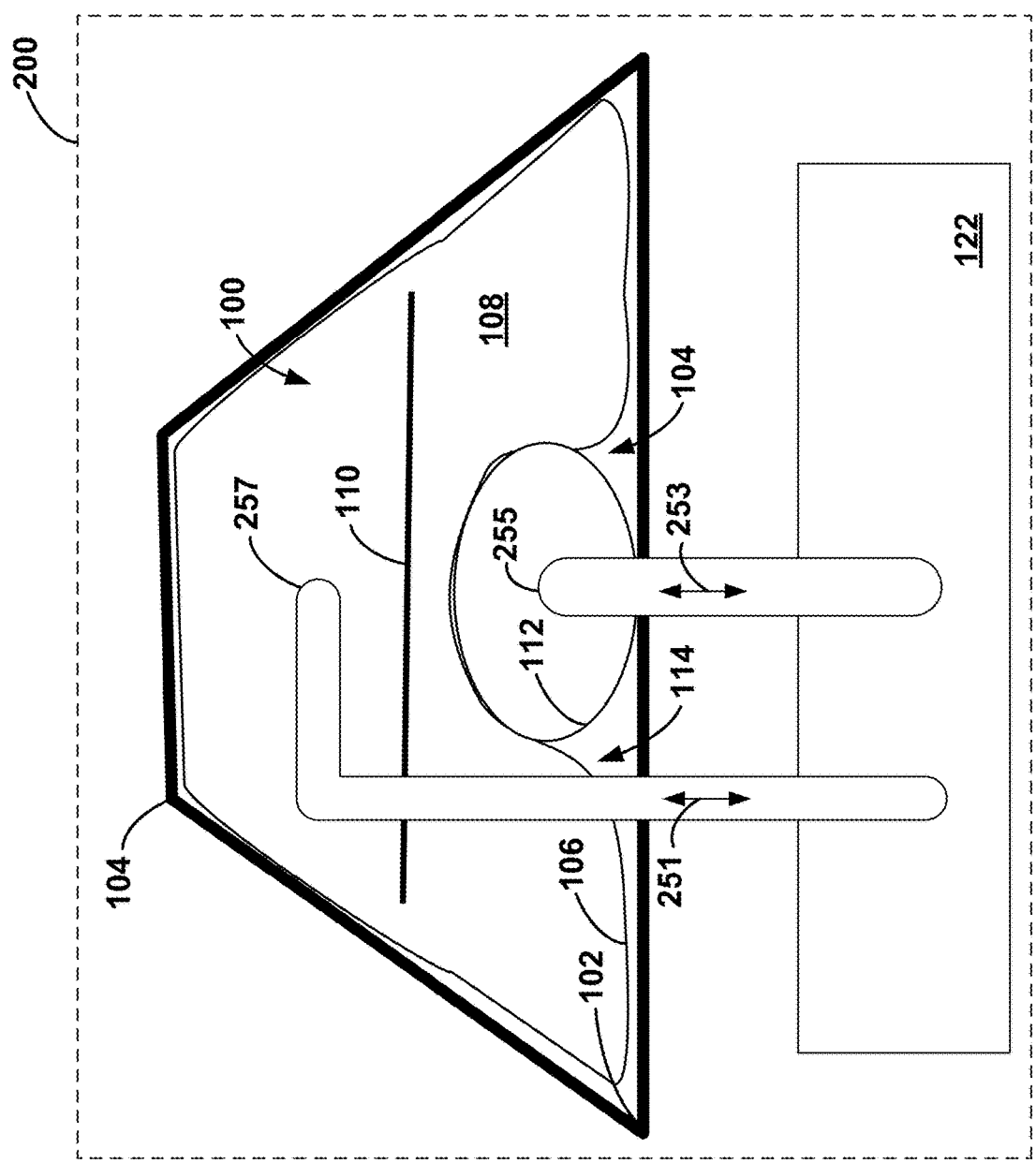
FIG. 7 is a schematic diagram of a system, according to an example.

FIG. 7 is a schematic diagram of a system 200 for heating the contoured surface 102 of the structural member 104. The system 200 includes the first bladder 106 and the granular material 108 within the first bladder 106. The granular material 108 is capable of exhibiting granular jamming when air 251 is removed from the first bladder 106. The system 200 further includes the heating element 110 positioned within the first bladder 106 and in contact with the granular material 108. The system 200 also includes a pump 122 that, when the first bladder 106 is against the contoured surface 102 of the structural member 104, is configured to remove the air 251 from the first bladder 106 to compress the granular material 108 such that the granular material 108 exhibits granular jamming that causes the first bladder 106 to provide rigid support against the contoured surface 102 of the structural member 104.

As such, the pump 122 is configured to move the air 251 to either inflate or deflate the first bladder 106 via a port 257. The pump 122 is also configured to move the air 253 to either inflate or deflate the second bladder 112 via a port 255.

Figure 8:
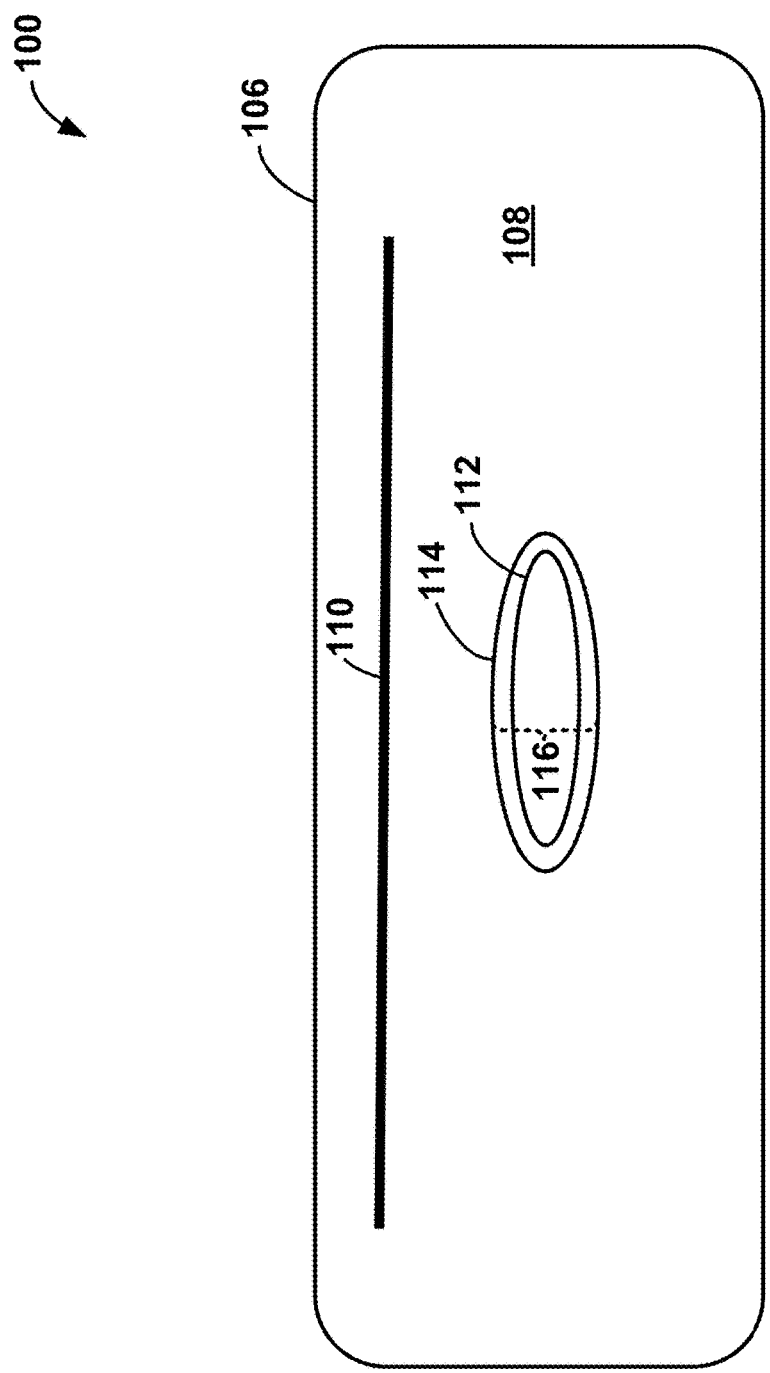
FIG. 8 is a schematic cross section of a heater, according to an example.

FIG. 8 is another schematic cross section of the heater 100. In this example, an exterior surface 114 of the first bladder 106 defines a cavity 116 that is substantially surrounded by the first bladder 106. The heater 100 also includes the second bladder 112 that is positioned within the cavity 116 defined by the first bladder 106.

Figure 9:
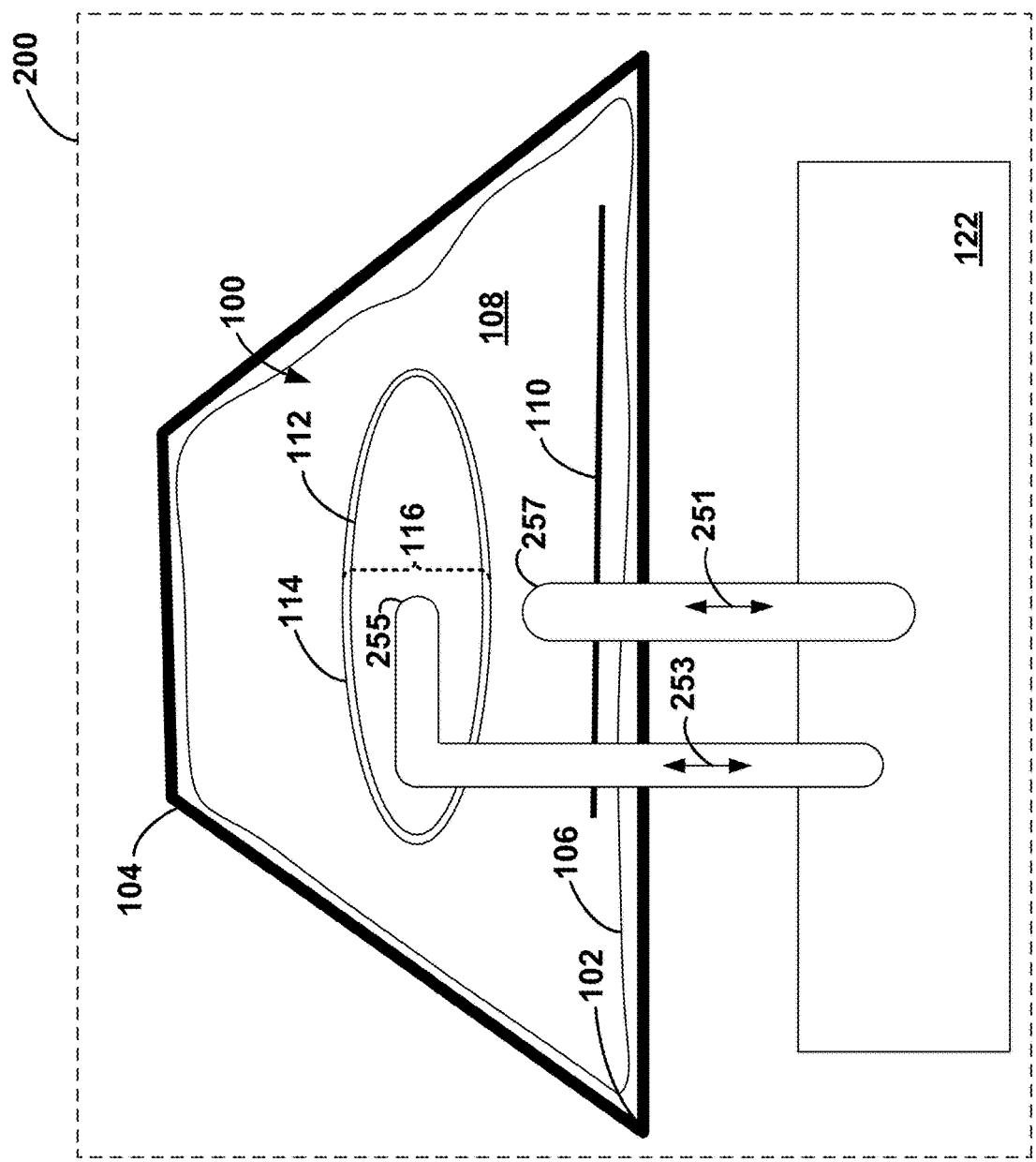
FIG. 9 is a schematic diagram of a system, according to an example.

FIG. 9 is another embodiment of the system 200 that includes the heater shown in FIG. 8. The system 200 includes the first bladder 106 and the granular material 108 within the first bladder 106. The granular material 108 is capable of exhibiting granular jamming when the air 251 is removed from the first bladder 106. The system 200 further includes the heating element 110 positioned within the first bladder 106 and in contact with the granular material 108. The system 200 also includes the pump 122 that, when the first bladder 106 is against the contoured surface 102 of the structural member 104, is configured to remove the air 251 from the first bladder 106 to compress the granular material 108 such that the granular material 108 exhibits granular jamming that causes the first bladder 106 to provide rigid support against the contoured surface 102 of the structural member 104.

As such, the pump 122 is configured to move the air 251 to either inflate or deflate the first bladder 106 via the port 257. The pump 122 is also configured to move the air 253 to either inflate or deflate the second bladder 112 via the port 255.

Figure 10:
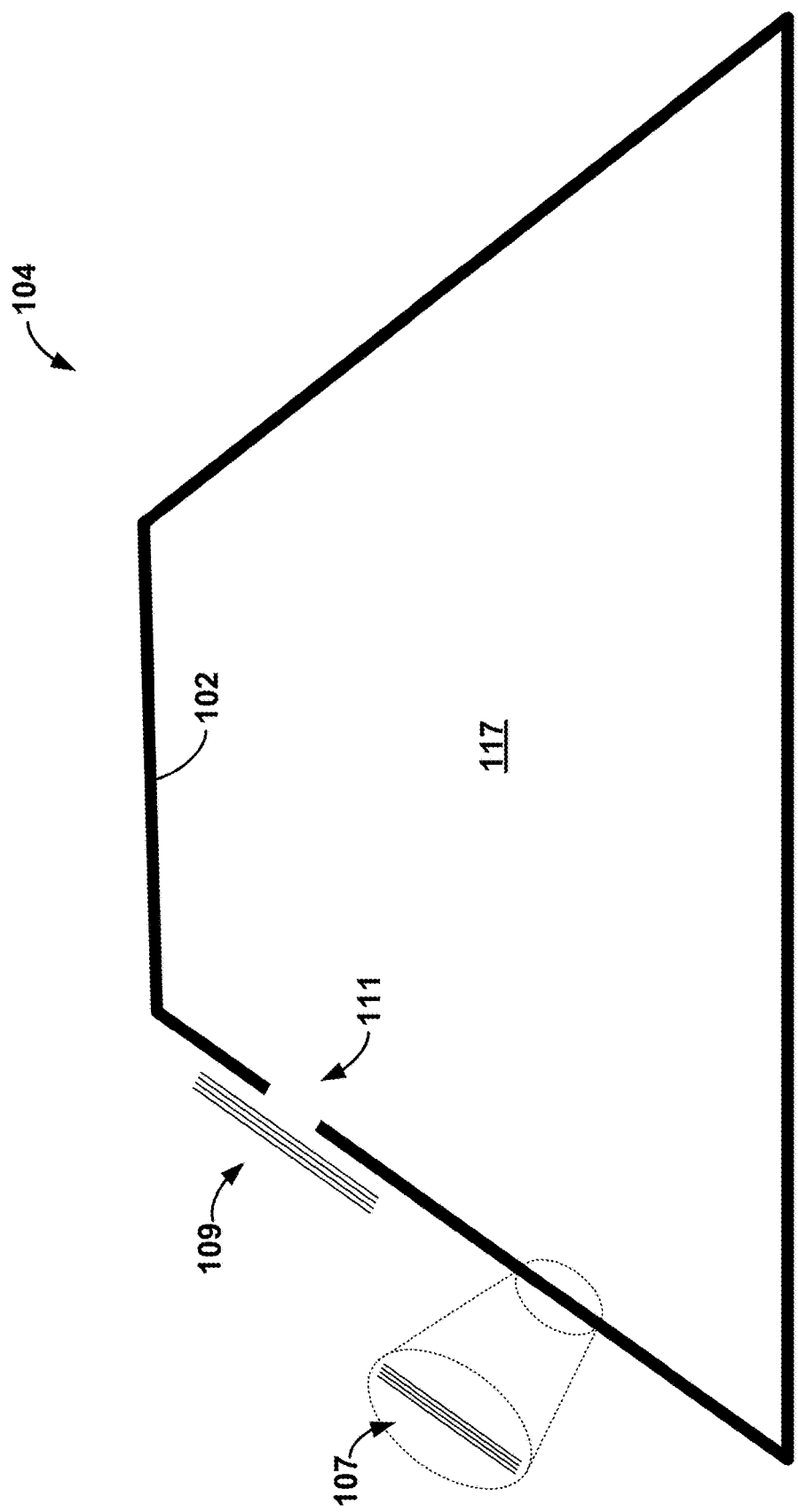
FIG. 10 is a schematic diagram of a structural member, according to an example.

FIG. 10 is a schematic diagram of the structural member 104. As shown in a magnified area of FIG. 10, the structural member 104 may include a plurality of layers of uncured or unprocessed composite material 107 (e.g., thermoplastic or thermoset). In this context, the heater 100 is used to heat the contoured surface 102 of the structural member 104, for example, such that the plurality of layers of uncured or unprocessed composite material 107 bond together (e.g., consolidate) to form a rigid yet lightweight surface.

In a similar manner, processing the structural member 104 may include applying one or more layers of composite material 109 (e.g., uncured or unprocessed thermoset or thermoplastic material) over a damaged area 111 of the structural member 104 (e.g., a cured composite part). In this context, heating the contoured surface 102 of the structural member 104 may further include curing the one or more layers of uncured or unprocessed thermoset or thermoplastic material to repair the damaged area 111.

Figure 11:
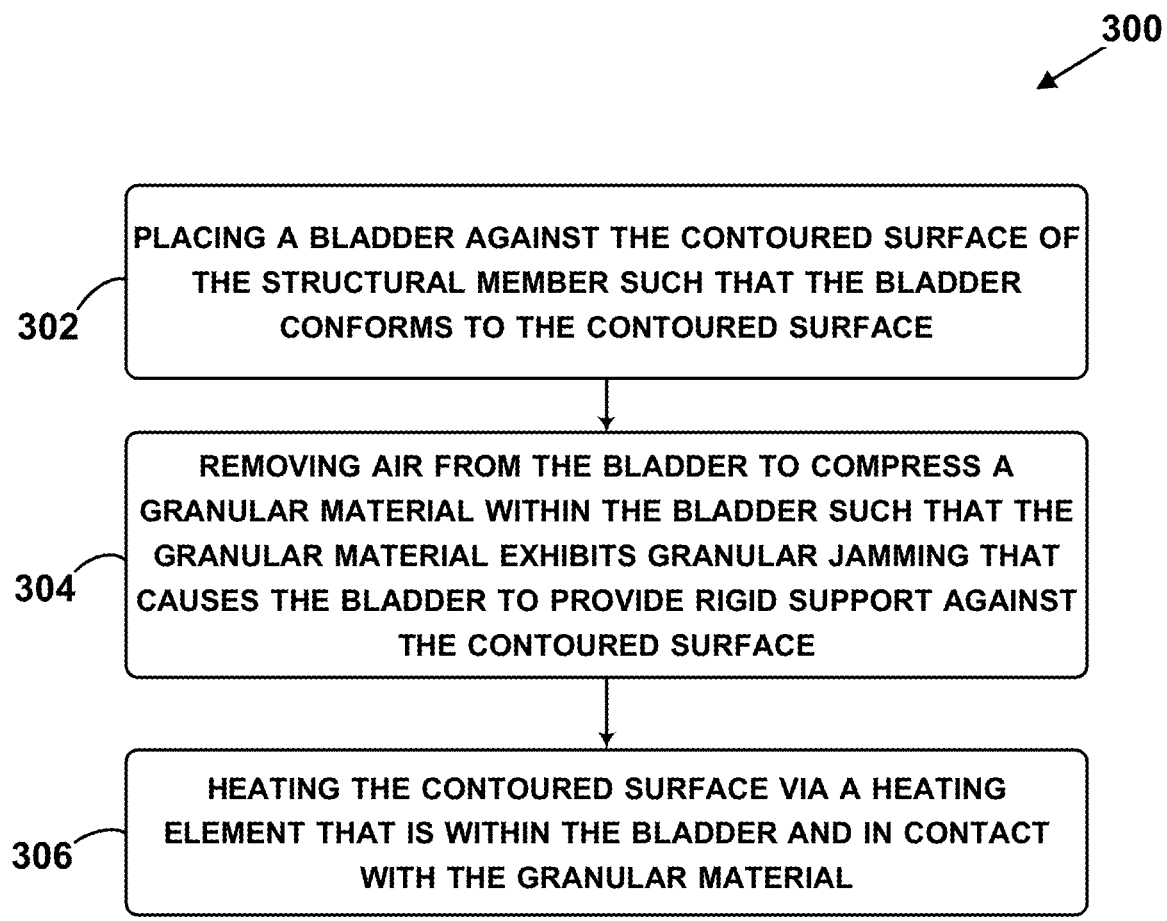
FIG. 11 is a block diagram of a method, according to an example.
Figure 12:
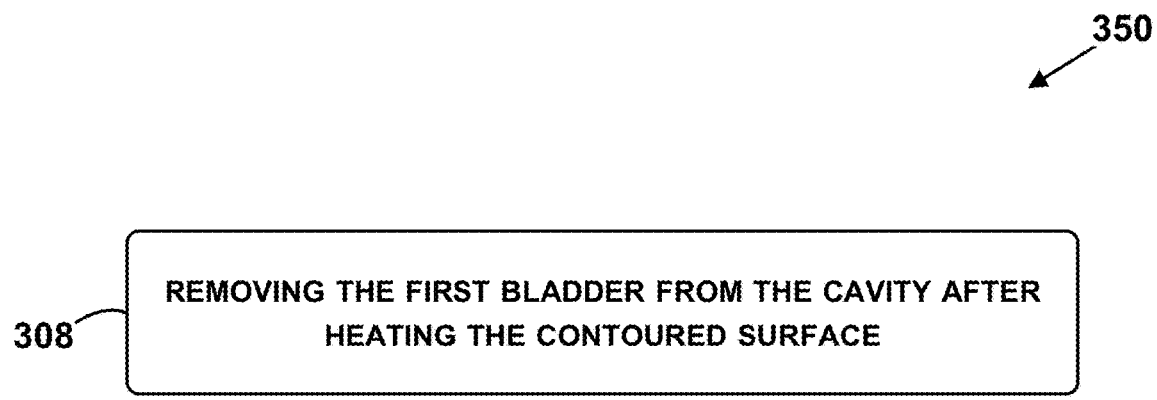
FIG. 12 is a block diagram of a method, according to an example.
Figure 13:
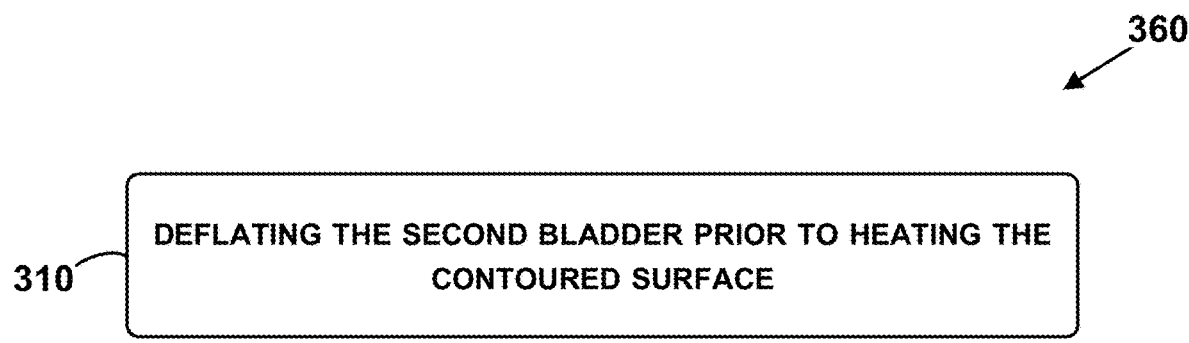
FIG. 13 is a block diagram of a method, according to an example.

FIGS. 11-13 are block diagrams of the methods 300, 350, and 360 for heating the contoured surface 102 of the structural member 104. The methods 300, 350, and 360 present examples of methods that could be used with the heater 100 or the system 200 as shown in FIGS. 1-10. As shown in FIGS. 11-13, the methods 300, 350, and 360 include one or more operations, functions, or actions as illustrated by blocks 302, 304, 306, 308, and 310. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 302, the method 300 includes placing the first bladder 106 against the contoured surface 102 of the structural member 104 such that the first bladder 106 conforms to the contoured surface 102. This functionality is depicted in FIGS. 2, 3, 5, 7, and 9 and discussed in more detail above.

At block 304, the method 300 includes removing the air 251 from the first bladder 106 to compress the granular material 108 within the first bladder such that the granular material 108 exhibits granular jamming that causes the first bladder 106 to provide rigid support against the contoured surface 102. This functionality is depicted in FIGS. 3, 6, 7, and 9 and discussed in more detail above.

At block 306, the method 300 includes heating the contoured surface 102 via the heating element 110 that is within the first bladder 106 and in contact with the granular material 108. This functionality is depicted in FIGS. 3, 6, 7, and 9 and discussed in more detail above.

At block 308, the method 350 includes removing the first bladder 106 from the cavity 117 after heating the contoured surface 102. This functionality is discussed above with reference to FIGS. 3, 6, 7, and 9.

At block 310, the method 360 includes deflating the second bladder 112 prior to heating the contoured surface 102. This functionality is discussed above with reference to FIGS. 3, 6, 7, and 9.

Examples of the present disclosure can thus relate to one of the enumerated clauses (ECs) listed below.

EC 1 is a heater for heating a contoured surface of a structural member, the heater comprising: a bladder; a granular material within the bladder, wherein the granular material is capable of exhibiting granular jamming when air is removed from the bladder; and a heating element positioned within the bladder and in contact with the granular material.

EC 2 is the heater of EC 1, wherein the granular material is electrically non-conductive.

EC 3 is the heater of any of ECs 1 or 2, wherein the heating element comprises a resistive heating element.

EC 4 is the heater of any of ECs 1-3, wherein the heating element comprises a sheet of carbon.

EC 5 is the heater of any of ECs 1-4, wherein the granular material comprises sand, ball bearings, glass beads, quartz beads, a foam, a polymer, an emulsion, or a suspension.

EC 6 is the heater of any of ECs 1-5, wherein the bladder comprises an elastic material that is impermeable to air.

EC 7 is the heater of any of ECs 1-6, wherein the bladder is a first bladder, the heater further comprising a second bladder configured to expand and apply a force to the first bladder.

EC 8 is the heater of any of ECs 1-6, wherein the bladder is a first bladder, the heater further comprising a second bladder that is positioned adjacent to an exterior surface of the first bladder.

EC 9 is the heater of any of ECs 1-6, wherein the bladder is a first bladder, wherein an exterior surface of the first bladder defines a cavity that is substantially surrounded by the first bladder, the heater comprising a second bladder that is positioned within the cavity defined by the first bladder.

EC 10 is a system for heating a contoured surface of a structural member, the system comprising: a bladder; a granular material within the bladder, wherein the granular material is capable of exhibiting granular jamming when air is removed from the bladder; a heating element positioned within the bladder and in contact with the granular material; and a pump that, when the bladder is against the contoured surface of the structural member, is configured to remove air from the bladder to compress the granular material such that the granular material exhibits granular jamming that causes the bladder to provide rigid support against the contoured surface of the structural member.

EC 11 is a method for heating a contoured surface of a structural member, the method comprising: placing a bladder against the contoured surface of the structural member such that the bladder conforms to the contoured surface; removing air from the bladder to compress a granular material within the bladder such that the granular material exhibits granular jamming that causes the bladder to provide rigid support against the contoured surface; and heating the contoured surface via a heating element that is within the bladder and in contact with the granular material.

EC 12 is the method of EC 11, wherein the structural member comprises a plurality of layers of unprocessed composite material.

EC 13 is the method of any of ECs 11-12, wherein the structural member is a cured composite structure, wherein heating the contoured surface comprises curing a thermoset composite material against the contoured surface.

EC 14 is the method of any of ECs 11-13, wherein the contoured surface is a concave surface.

EC 15 is the method of any of ECs 11-13, wherein the contoured surface is a convex surface.

EC 16 is the method of any of ECs 11-15, wherein the contoured surface is a closed curve defining a cavity.

EC 17 is the method of any of ECs 11-16, wherein placing the bladder against the contoured surface comprises inserting the bladder into a cavity defined by the contoured surface, the method further comprising removing the bladder from the cavity after heating the contoured surface.

EC 18 is the method of any of ECs 11-17, wherein heating the contoured surface comprises heating the contoured surface via thermal conduction of the granular material.

EC 19 is the method of any of ECs 11-18, wherein the bladder is a first bladder and placing the first bladder against the contoured surface comprises inflating a second bladder such that the second bladder expands and forces the first bladder against the contoured surface.

EC 20 is the method of EC 19, further comprising deflating the second bladder prior to heating the contoured surface.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A system for heating a contoured surface of a structural member, the system comprising:
   a bladder;
   a granular material within the bladder, wherein the granular material is capable of exhibiting granular jamming when air is removed from the bladder;
   a pump configured to remove air from the bladder and compress the granular material; and
   a heating element positioned within the bladder and in contact with the granular material, and the heating element configured to heat the compressed granular material after the pump has removed air from the bladder, and the compressed granular material configured to conduct heat from the heating element to the contoured surface.

2. The system of claim 1, wherein the granular material is electrically nonconductive.

3. The system of claim 1, wherein the heating element comprises a resistive heating element.

4. The system of claim 1, wherein the heating element comprises a sheet of carbon.

5. The system of claim 1, wherein the granular material comprises sand, ball bearings, glass beads, quartz beads, a foam, a polymer, an emulsion, or a suspension.

6. The system of claim 1, wherein the bladder comprises an elastic material that is impermeable to air.

7. The system of claim 1, wherein the bladder is a first bladder, the system further comprising a second bladder configured to expand and apply a force to the first bladder.

8. The system of claim 1, wherein the bladder is a first bladder, the system further comprising a second bladder that is positioned adjacent to an exterior surface of the first bladder.

9. The system of claim 1, wherein the bladder is a first bladder, wherein an exterior surface of the first bladder defines a cavity that is substantially surrounded by the first bladder, the system comprising a second bladder that is positioned within the cavity defined by the first bladder.

10. A method of using the system of claim 1, the method comprising:
    placing the bladder against the contoured surface of the structural member such that the bladder conforms to the contoured surface;
    removing air from the bladder to compress the granular material within the bladder such that the granular material exhibits granular jamming that causes the bladder to provide rigid support against the contoured surface; and
    heating the contoured surface via the heating element.

11. The method of claim 10, wherein the structural member comprises a plurality of layers of unprocessed composite material.

12. The method of claim 10, wherein the structural member is a cured composite structure, wherein heating the contoured surface comprises curing a thermoset composite material against the contoured surface.

13. The method of claim 10, wherein the contoured surface is a concave surface.

14. The method of claim 10, wherein the contoured surface is a convex surface.

15. The method of claim 10, wherein the contoured surface is a closed curve defining a cavity.

16. The method of claim 10, wherein placing the bladder against the contoured surface comprises inserting the bladder into a cavity defined by the contoured surface, the method further comprising removing the bladder from the cavity after heating the contoured surface.

17. The method of claim 10, wherein heating the contoured surface comprises heating the contoured surface via thermal conduction of the granular material.

18. The method of claim 10, wherein the bladder is a first bladder and placing the first bladder against the contoured surface comprises inflating a second bladder such that the second bladder expands and forces the first bladder against the contoured surface.

19. The method of claim 18, further comprising deflating the second bladder prior to heating the contoured surface.

20. A system for heating a contoured surface of a structural member, the system comprising:

a bladder;
a granular material within the bladder, wherein the granular material is capable of exhibiting granular jamming when air is removed from the bladder;
a heating element positioned within the bladder and in contact with the granular material; and
a pump that, when the bladder is against the contoured surface of the structural member, is configured to remove air from the bladder to compress the granular material such that the granular material exhibits granular jamming that causes the bladder to provide rigid support against the contoured surface of the structural member
wherein the heating element is configured to heat the compressed granular material after the pump has removed air from the bladder, and the compressed granular material is configured to conduct heat from the heating element to the contoured surface.

* * * * *